(12) United States Patent
Minami et al.

(10) Patent No.: US 8,526,201 B2
(45) Date of Patent: Sep. 3, 2013

(54) SWITCHING POWER UNIT HAVING SWITCHING CONTROLLER CONTROLLING PFC VOLTAGE BY CHANGING ON-DUTY OF FIRST AND SECOND SWITCHING ELEMENTS

(75) Inventors: Eiji Minami, Kitasaku-gun (JP); Shigemi Masuda, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 285 days.

(21) Appl. No.: 13/051,375

(22) Filed: Mar. 18, 2011

(65) Prior Publication Data

US 2011/0242854 A1    Oct. 6, 2011

(30) Foreign Application Priority Data

Apr. 1, 2010   (JP) ................................. 2010-085394

(51) Int. Cl.
*H02M 3/335*        (2006.01)
(52) U.S. Cl.
USPC ........................................... 363/17; 363/127
(58) Field of Classification Search
USPC ............. 363/17, 34, 108, 123, 125–127, 130, 363/159, 163, 165
See application file for complete search history.

(56) References Cited

U.S. PATENT DOCUMENTS 8,218,338 B2*   7/2012   Lin .................................. 363/17

FOREIGN PATENT DOCUMENTS

| JP | A-2006-079985 | 3/2006 |
|---|---|---|
| JP | A-2008-283818 | 11/2008 |

* cited by examiner

*Primary Examiner* — Adolf Berhane
*Assistant Examiner* — Yemane Mehari
(74) *Attorney, Agent, or Firm* — Oliff & Berridge, PLC (57) ABSTRACT

There is provided switching power unit comprising: a PFC voltage detector that detects PFC voltages of the power-factor improvement unit; an output voltage detector that is provided in a current resonance converter unit; a switching controller into which output signals from the PFC voltage detector and output signals from the output voltage detector are input, wherein the switching controller in a full-bridge circuit of first to fourth switching elements, based on output signals from the PFC voltage detector and the output voltage detector, controls the PFC voltages by changing on-duty of the first and second switching elements, and also controls the output voltages by changing switching frequencies of the full-bridge circuit.

13 Claims, 10 Drawing Sheets

Gate Voltage

Switching Wave Form

PFC ON Periods
(Changeable)

Inverter Output Voltage

SWITCHING POWER UNIT HAVING SWITCHING CONTROLLER CONTROLLING PFC VOLTAGE BY CHANGING ON-DUTY OF FIRST AND SECOND SWITCHING ELEMENTS

BACKGROUND OF THE INVENTION

1. Field of the Invention

The present invention relates to an AC/DC converter provided with a power-factor improvement (PFC) unit and a current resonance (LLC) converter unit, more particularly to a switching power unit that can achieve highly effective performances through a power-factor improvement operation and an output voltage control by changing the on-duty and the switching frequency of a full-bridge type switching element.

2. Description of the Related Art

For digital apparatuses or home-use amusement equipments such as laptop computers, liquid crystal televisions, plasma televisions, game machines, a switching power unit that is provided with an AC/DC converter in which to improve a power-factor has been used. In general, the switching power unit is composed of a full-wave rectifier bridge, a booster type power-factor improvement (PFC) unit and a DC/DC converter portion.

For the DC/DC converter portion, a flyback type converter, a forward type converter, a current resonance (LLC) type converter, etc. may be named. Here, when a highly effective power source is required, the current resonance type converter has been widely applied.

Figure 8:
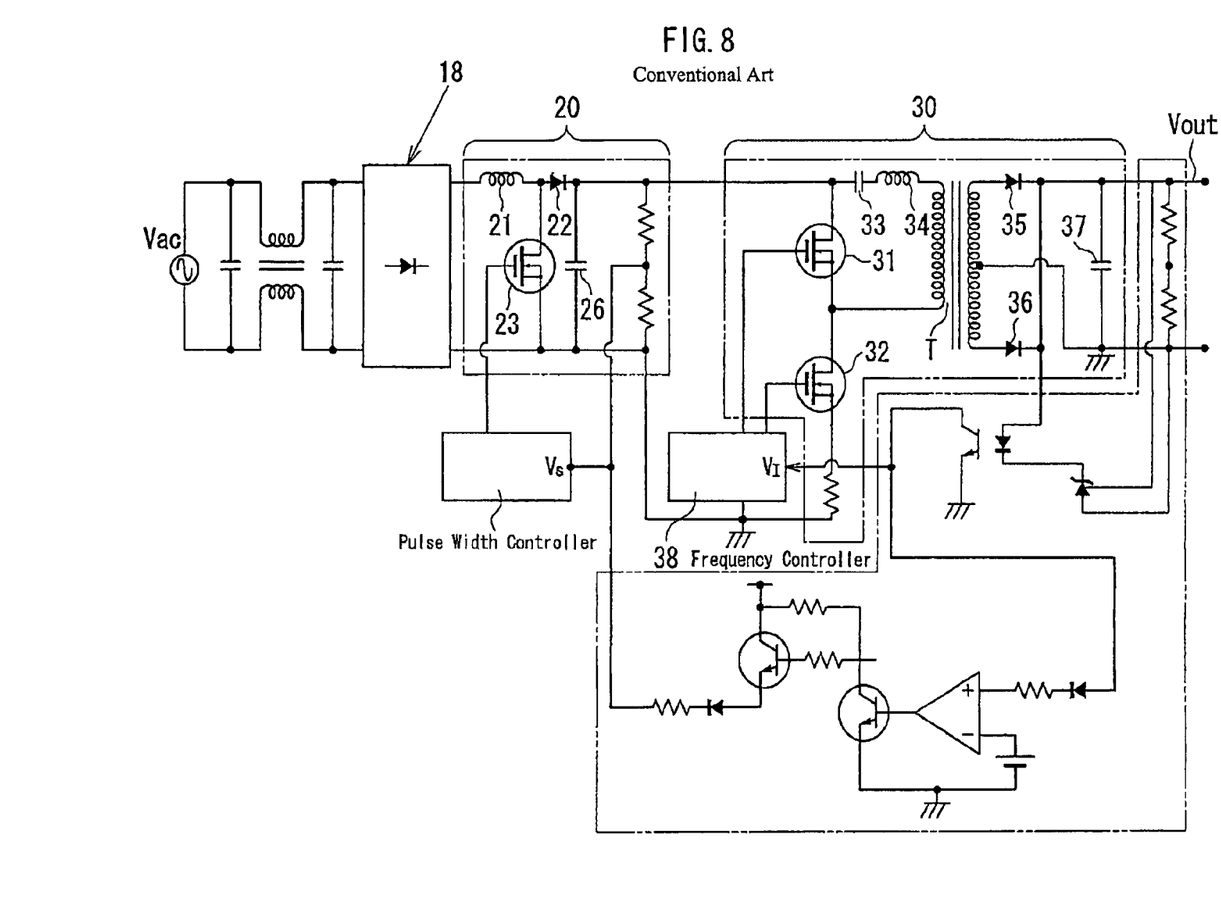
FIG. 8 is a circuit block diagram of a conventional switching power unit that is composed of a full-wave rectifier bridge, a power-factor improvement unit and a current resonance converter.

In FIG. 8, a half-bridge type switching power unit is disclosed. See Japanese Patent Application Laid-Open No. 2008-283818 (Patent Document 1). This half-bridge type switching power unit is composed of a full-wave rectifier bridge 18, a power-factor improvement portion 20, and a half-bridge type current resonance converter 30.

In the circuit structure of the half-bridge type switching power unit, the power-factor improvement portion 20 has an active filter including an inductor 21, a diode 22 and a switch element 23 as well as a smoothing capacitor 26, between the full-wave rectifier bridge 18 and two switching elements 31, 32 provided on the input side of the current resonance converter 30.

Further, in the current resonance converter 30, a series resonant circuit (a resonant capacitor 33 and a resonant inductor 34) is connected between the intermediate point of series circuit of the switching elements 31, 32 and the primary winding of a transformer T. Current that flows toward the secondary winding of the transformer T is rectified and smoothed by rectifier diodes 35, 36 and a capacitor 37 so as to obtain predetermined output voltages.

In this circuit, the switching elements 31, 32 alternatively conduct On-Off operations through a frequency controller 38. Switched high frequency voltages are applied to both ends of the primary winding of the transformer T and then output to a secondary side through the transformer T thus being converted into DC output voltages.

This switching power unit can provide high conversion efficiencies to the current resonance converter 30; however, the switching power unit is structured by three multi-stage circuits composed of: the full-wave rectifier bridge 18; the power-factor improvement portion 20; and the current resonance converter 30. Accordingly, the overall efficiency of the device is generally decreased to approximately 85 to 90%.

Figure 9:
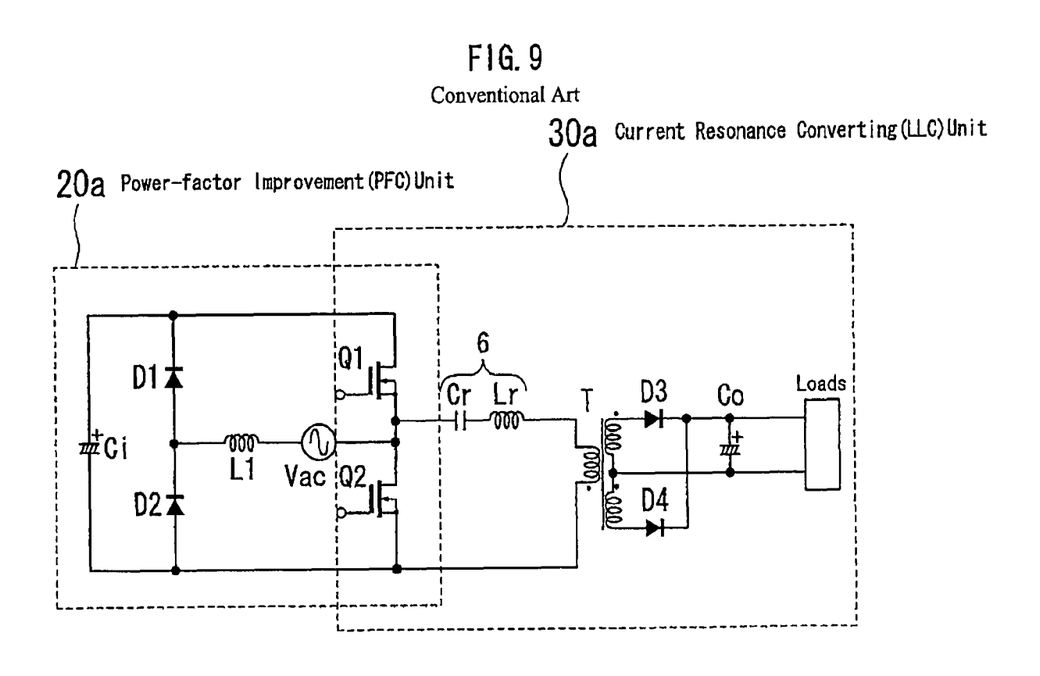
FIG. 9 is a circuit block diagram of a conventional half-bridge type switching power circuit.

Considering the above, the present inventor, as shown in FIG. 9, invented a half-bridge type switching power unit that has improved conversion efficiencies in such a manner as to eliminate a full-wave rectifier bridge and to commonly utilize the switching elements of both a power-factor improvement unit and a current resonance converter.

This switching power unit includes an AC/DC converter circuit composed of a power-factor improvement (PFC) portion 20a and a current resonance converter (LLC) portion 30a. In the power-factor improvement portion 20a, the series circuit of first and second diodes D1, D2 is connected in parallel with the series circuit of first and second switching elements Q1, Q2 in a forward direction. At the intermediate point between the both series circuits, a booster inductor L1 and an AC source Vac are connected in series. Further, a first smoothing capacitor (an electrolytic capacitor) Ci is connected on the both sides of the series circuit of the first and second diodes D1, D2 in parallel to the first and second switching elements Q1, Q2.

The current resonance converter 30a includes: first and second switching elements Q1, Q2 of a half-bridge circuit sharing the series circuit of the first and second switching elements Q1, Q2 of the power-factor improvement portion 20a; a series resonant circuit 6 including a resonant inductor Lr and a resonant capacitor Cr placed on the primary side between the half-bridge circuit and a high frequency transformer T; and a rectifier circuit including rectifier diodes D3, D4 and a second smoothing capacitor Co on the secondary side of the transformer. The series resonant circuit 6 is connected in series with the primary winding of the high frequency transformer T.

The power-factor improvement portion 20a performs as a booster circuit as that when AC power-supply voltages are in a positive half cycle (hereinafter, when the intermediate point side of the first and second switching elements Q1, Q2 is a positive voltage, this condition will be referred to as the "positive half cycle"), energy stored in the booster inductor L1 when the second switching element Q2 is ON is transferred to the smoothing capacitor Ci when the second switching element Q2 is OFF. Further, when the AC power-supply voltages Vac are in a negative half cycle, energy stored in the booster inductor L1 when the first switching element Q1 is ON is transferred to the first smoothing capacitor Ci when the first switching element Q1 is OFF.

In this switching power circuit, since there is no full-wave rectifier bridge, further high efficiency can be obtained compared to the switching power circuit disclosed in the Patent Document 1. See FIG. 8. In addition, since a number of parts can be minimized, it would be possible to structure a circuit with less cost.

However, since the above-described half-bridge circuit is designed as that the on-duty of the switching elements is approximately 50%, it would be difficult to control the power-factor improvement unit that shares the switching elements. For example, even when loads are relatively small, the on-duty of the switching element cannot be further narrowed. Accordingly, the PFC voltages of the power-factor improvement unit excessively increase, whereby there is a risk that the switching elements or the capacitor may be damaged.

Further, in conventional power-factor improvement circuits, there are a critical current mode or a continuous current mode. In these modes, the power-factor improvement operations are adapted to perform by changing the on-duty of switching elements according to the phase angles of AC input voltages. However, considering a switching power circuit disclosed in FIG. 9, since the on-duty of switching elements is fixed to approximately 50%, when the instantaneous value of the AC input voltages and the value of PFC voltage come closer, it would become difficult to appropriately perform power-factor improvement operations.

On the other hand, for example, as a full-bridge type switching power unit that improves power-factors while reducing a number of parts, Japanese Patent Application Laid-Open No. 2006-79985 (Patent Document 2) discloses the structure of electronic ballast for use of electric discharge lamps. See FIG. 10.

Figure 10:
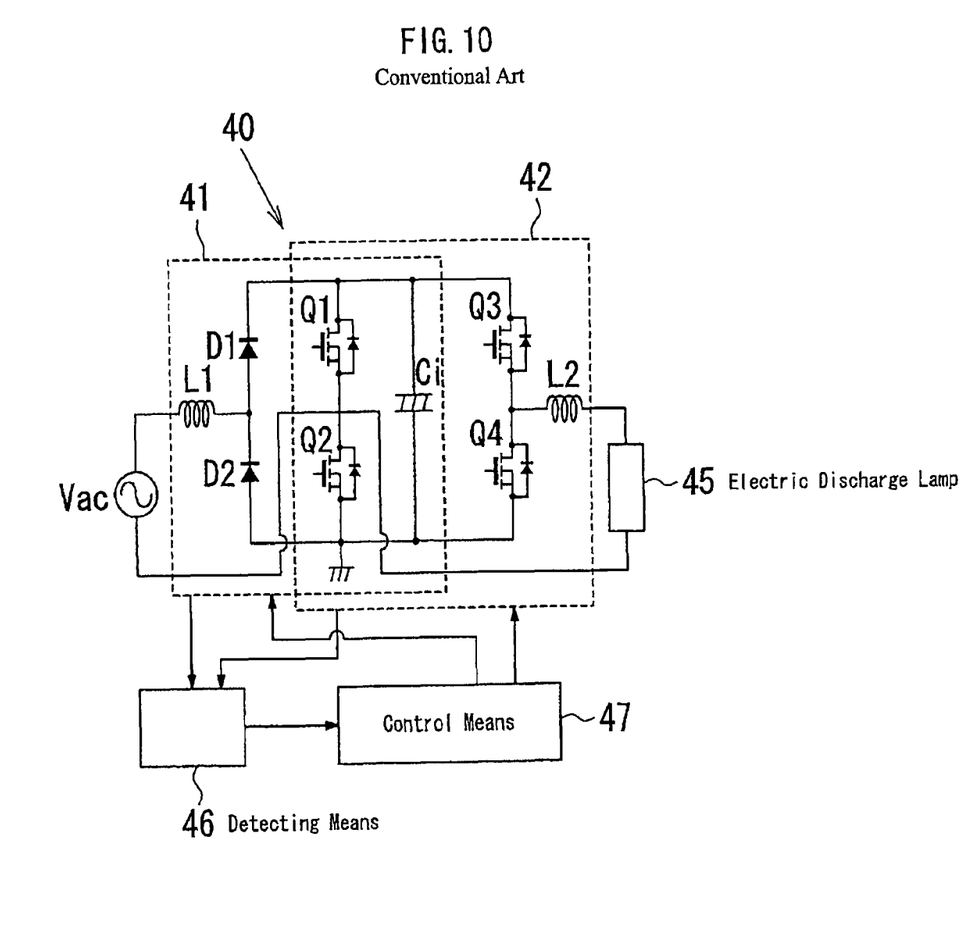
FIG. 10 is a circuit block diagram based on a conventional full-bridge type electronic ballast for electric discharge lamps.

In FIG. 10, a power unit 40 is composed of a power-factor improvement unit (a converter circuit unit) 41 and a full-bridge circuit unit (an inverter circuit unit) 42. With 4 switching elements Q1 to Q4, an electric power is suppliable to electric discharge lamps while improving its power-factor. This power unit 40 performs the boost of input voltages by changing the on-duty of first and second switching elements Q1 and Q2. Based on the on-duty, timing to supply electric current to the electric discharge lamps is controlled, so that it would be possible to supply high output powers to the electric discharge lamps while improving its power-factor.

The circuit structure of this power unit 40 is composed of: the converter circuit unit 41 to rectify and boost input voltages from an AC source Vac; the inverter circuit unit 42 that supplies rectangular-wave output voltages to an electric discharge lamp 45; a detecting means 46 that detects voltage/current information of the converter circuit unit 41 and the inverter circuit unit 42; and a control means 47 that performs the switching control of the switching elements Q1 to Q4 included in the converter circuit unit 41 and the inverter circuit unit 42. Further, although 4 switching elements Q1 to Q4 are used, the converter circuit unit 41 and the inverter circuit unit 42 partially share these switching elements.

Considering power-factor improvement operations in this case, the first and the second switching elements Q1 and Q2 alternatively repeat ON-and-OFF operations. When AC input voltages are the positive half cycle, energy is to be stored in a choke coil while the second switching element Q2 is ON. When the second switching element Q2 is OFF, energy that has been stored in a choke coil L1 is transferred to a first smoothing capacitor Ci.

Here, for power-factor improvement, (when the continuous current mode is applied), the on-duty of the second switching element Q2 is adapted to change according to the phase angle of the AC input voltages. An ON width will be widened when the input voltages are low. On the other hand, when the input voltages are high, the ON width will be narrowed. That is, when the phase angle is nearly 0 degree or 180 degrees, the on-duty of the second switching element Q2 is widened. To the contrary, when the phase angle is 90 degrees, it is controlled to make the on-duty to become the minimum. Here, as regards the first switching element Q1, when the phase angle is nearly 0 or 180 degrees, the on-duty is narrowed, whereas when the phase angle is 90 degrees, the on-duty is widened. In case that the AC input voltages are the negative half cycle, the role between the first and the second switching elements Q1 and Q2 will be reversed.

In the inverter operation of the switching elements Q1 to Q4, when the first and the fourth switching elements Q1 and Q4 are ON, negative electrode voltages are output to lamp loads. When the second and the third switching elements Q2 and Q3 are ON, positive electrode voltages will be output. Since the switching elements Q1 and Q2 also work for power-factor improvement operations, on-duty is changed according to phase angles. When the phase angle is nearly 90 degrees on the positive half cycle, the on-duty of the second switching element Q2 is small (on the contrary, the on-duty of the first switching element Q1 is large).

Accordingly, if positive inverter operations are performed approximately at the phase angle of 90 degrees on the positive half cycle, sufficient power is not suppliable to the load due to small on-duty of the second and the third switching elements Q2 and Q3. Based on the above, approximately at the phase angle of 90 degrees, the negative inverter operations should be performed in combination of the first and the fourth switching elements Q1 and Q4 that have large on-duty, to supply necessary power to the load.

When the phase angle is nearly 0 degree or 180 degrees, since the on-duty of the switching element Q2 becomes larger, positive inverter operations will be performed in combination of the second and the third switching elements Q2 and Q3. Here, when AC input voltages are the negative cycle, operations will be reversed relative to the above.

Accordingly, in this circuit, by changing polarities of the inverter outputs according to the on-duty (that is, the phase angle of the AC input voltages) of the first and second switching elements Q1 and Q2, sufficient output powers will be suppliable.

In this circuit, however, since the polarities of the inverter outputs are determined according to the phase angle, when the phase angle is approximately 90 degrees, only negative polarities are allowed for output. Further, when the phase angle is approximately 0 degree or 180 degrees, only positive polarities are allowed for output. Here, when the AC input voltages are the negative half cycle, operations become reversed. Note that the output voltages of inverter are generally the positive polarity and the negative polarity in asymmetry. The general inverter outputs positive polarities and negative polarities in an alternative manner; however, the above operations are not in conformity therewith. The operations do not thus necessarily fit to optional loads.

As described hereinabove, since the switching power unit shown in FIG. 9 is the half-bridge type, the on-duty becomes fixed to approximately 50%. Accordingly, it would be difficult to control the power-factor improvement unit that shares the switching elements. On the other hand, the switching power unit of Patent Document 2 shown in FIG. 10 shows the full-bridge type. However, the polarities of the inverter outputs are determined based on the phase angles of the AC input voltages. This type of the unit does not apply the method of outputting positive and negative polarities in an alternative manner like general inverter operations. Here, voltage waveforms will be asymmetric pulse waveforms.

SUMMARY OF THE INVENTION

The present invention has been made in light of the above problems, and it is an object of the present invention to provide a switching power unit that enables to reduce switching loss and to achieve high efficiencies while achieving low cost and simple-structured circuit architectures.

In order to achieve the object described above, according to a first aspect of the present invention, there is provided a switching power unit comprising a full-bridge type AC/DC converter circuit structured in combination with a power-factor improvement unit and a current resonance converter unit, the power-factor improvement unit and the current resonance converter unit sharing first and second switching elements, the switching power unit including: a PFC voltage detector that is provided in the power-factor improvement unit and that detects PFC voltages stored in a first smoothing capacitor connected in parallel with a series circuit of the first and second switching elements; an output voltage detector that is provided in the current resonance converter unit and that detects DC output voltages stored in a second smoothing capacitor on a secondary side through a high-frequency transformer based on high-frequency voltages obtained by ON-and-OFF operations of a full-bridge circuit on a primary side, the full-bridge circuit being structured as that the first and second switching elements are connected in parallel with third and fourth switching elements; a switching controller into which output signals from the PFC voltage detector and output signals from the output voltage detector are input so as to control ON-and-OFF operations of the first to fourth switching elements, wherein the switching controller controls the PFC voltage by changing on-duty of the first and second switching elements, and also controls the output voltages by changing switching frequencies of the full-bridge circuit, based on the output signals from the PFC voltage detector and the output voltage detector, respectively.

In the first aspect of the present invention, the power-factor improvement unit comprises: a series circuit of first and second diodes connected in parallel with the series circuit of the first and second switching elements in a forward direction; a booster inductor and an AC source connected in series at an intermediate portion between both of the series circuits; and the first smoothing capacitor connected at both ends of the series circuit of the first and second diodes so as to be placed in parallel to the first and second switching elements.

In the first aspect of the present invention, the current resonance converter unit comprises: a full-bridge circuit where the series circuit of the first and second switching elements and the series circuit of the third and fourth switching elements are connected in parallel; a series resonant circuit including a resonant inductor and a resonant capacitor on the primary side of the high-frequency transformer; and a rectifier circuit including a network of rectifier diodes and the second smoothing capacitor on the secondary side of the high-frequency transformer, wherein the series resonant circuit is connected in series with a primary winding of the high-frequency transformer, and also connected at the intermediate point of the first and second switching elements and the intermediate point of the third and fourth switching elements.

In the first aspect of the present invention, a voltage resonant capacitor is connected between the intermediate point of the first and second switching elements and the intermediate point of the second and fourth switching elements, the voltage resonant capacitor being connected in parallel with the second switching element.

In the first aspect of the present invention, the PFC voltage detector and the output voltage detector each include: a voltage detecting circuit; and an error amplifier that compares a reference voltage value with an output voltage value that is output from the voltage detecting circuit.

In the first aspect of the present invention, the switching power unit further comprises a polar detector that is connected in parallel with the AC source where the first switching element is arranged on a high-voltage side while the second switching element is arranged on a low-voltage side, wherein the polar detector detects a voltage of at least one side of the AC source so as to detect polarity of the AC source and to output the detected result to the switching controller; the switching controller set on-duty of the second switching element to 50% or less in case that the intermediate point side of the first and the second switching elements of the AC source is a positive polarity; and the switching controller set on-duty of the first switching element to 50% or less in case that the intermediate point side of the first and second diodes of the AC source is a positive polarity.

In the first aspect of the present invention, the switching controller is arranged on the primary side of the high-frequency transformer, and output signals from the output voltage detector on the secondary side is transmitted to the switching controller on the primary side through a first insulation means.

In the first aspect of the present invention, the switching controller is arranged on the secondary side of the high-frequency transformer; output signals from the PFC voltage detector on the primary side is transmitted to the switching controller on the secondary side through a second insulation, means; and switching controlled signals output from the switching controller are transmitted to the first to fourth switching elements on the primary side through a third insulation means based on output signals from the output voltage detector on the secondary side, and based on output signals from the second insulation means.

In the first aspect of the present invention, output signals from the polar detector are transmitted to the switching controller on the secondary side through a fourth insulation means.

In the first aspect of the present invention, the first to fourth insulation means are a photocoupler or an isolating transformer.

In the first aspect of the present invention, the resonant inductor is replaceable by a leakage inductance of the high-frequency transformer.

As explained hereinabove, the switching power unit of the present invention is structured based on the full-bridge type AC/DC converter circuit where the power-factor improvement unit and the current resonance converter unit are combined. The PFC voltages of the power-factor improvement unit are controllable by changing on-duty of the first and second switching elements. On the other hand, the output voltages of the current resonance converter unit are also controllable by changing the switching frequencies of the full-bridge circuit. It can be thus said that the PFC voltages of the power-factor improvement unit and the output voltages of the current resonance converter unit can be individually controlled relative to each other.

Further, the present invention would be possible to reduce a number of parts, being able to achieve a good cost performance and a simplified structure since there is no need to provide a full-wave rectifier and the first and the second switching elements Q1 and Q2 are sharable, even though a full-bridge-method is used. Still further, by reducing switching loss and eliminating the multi-stages of its circuit structure, efficiency of the switching power unit of the present invention is more improved compared with a conventional method.

DETAILED DESCRIPTION OF THE PREFERRED EMBODIMENTS

Figure 1:
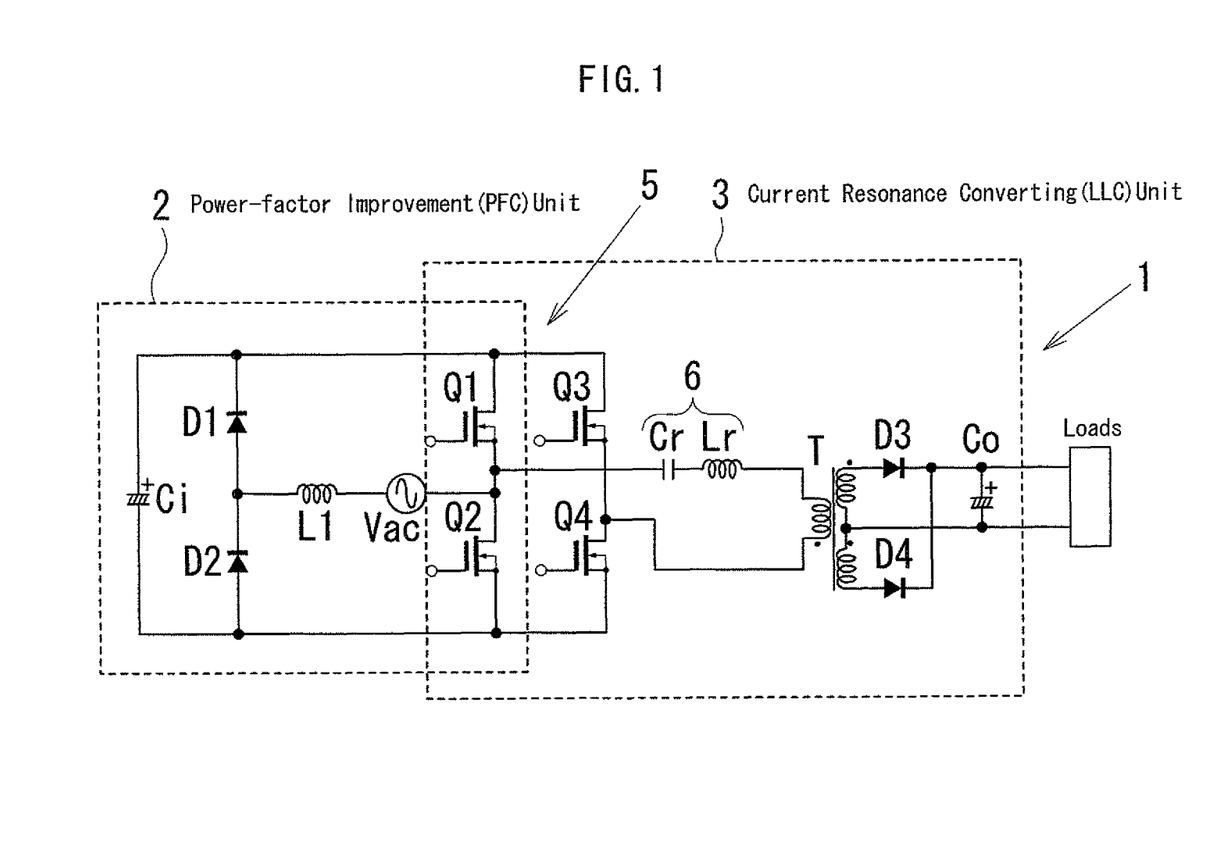
FIG. 1 is a block diagram that shows an AC/DC converter circuit that is a basic architecture of a switching power unit according to the first embodiment of the present invention.

Preferred embodiments of the present invention will be described with reference to the accompanying drawings. FIG. 1 is a block diagram that shows an AC/DC converter circuit 1 that is the basic architecture of a switching power unit according to the first embodiment of the present invention. The AC/DC converter circuit 1 as the main portion of the switching power unit shown in FIG. 1 is composed of a power-factor improvement (PFC) unit 2 and a current resonance converter (LLC) unit 3.

In the power-factor improvement unit 2, the series circuit of first and second diodes D1 and D2 and the series circuit of first and second switching elements Q1 and Q2 are connected in parallel. A booster inductor L1 and an AC source Vac are connected in series at the intermediate point of both series circuits. A first smoothing capacitor Ci is connected at the both ends of the series circuit of the first and the second diodes D1 and D2 in parallel with first and second switching elements Q1 and Q2.

The current resonance converter unit 3 shares the first and second switching elements Q1 and Q2 of the power-factor improvement unit 2. The series circuit of the first and second switching elements Q1 and Q2 and the series circuit of third and fourth switching elements Q3 and Q4 are connected in parallel so as to structure a full-bridge circuit 5 composed of 4 switching elements.

Between the full-bridge circuit 5 and a high-frequency transformer T, a series resonant circuit 6 including a resonant inductor Lr and a resonant capacitor Cr is provided on the primary side of the high-frequency transformer T. On the secondary side of the high-frequency transformer T, a rectifier circuit including rectifier diodes D3 and D4 and a second smoothing capacitor Co is provided. The series resonant circuit 6 is connected in series with the primary winding of the high-frequency transformer T. Further, the series resonant circuit 6 and the primary winding of the high-frequency transformer T are connected at the intermediate point of the first and second switching elements Q1 and Q2 as well as at the intermediate point of the third and fourth switching elements Q3 and Q4.

In the above circuit structure, as shown in FIG. 1, one end of the booster inductor L1 is connected at the intermediate point of the first and second diodes D1 and D2 while the other end thereof is connected with one end of the AC source Vac. However, the AC source Vac and the booster inductor L1 may be arranged in reverse. Further, either the resonant capacitor Cr or the resonant inductor Lr of the series resonant circuit 6, or both thereof may be connected between the intermediate point of the third and fourth switching elements Q3 and Q4 and the primary winding of the high-frequency transformer T. Still further, the resonant inductor Lr is replaceable by the leakage inductance of the high-frequency transformer T.

In the power-factor improvement unit 2, when the AC power-supply voltage is a positive half cycle, energy will be stored in the booster inductor L1 when the second switching element Q2 is ON. Then, when the first switching element Q1 is ON, energy stored in the booster inductor L1 is transferred to the first smooth capacitor Ci while being boosted. Similarly, when the AC power-supply voltage is a negative half cycle, energy is stored in the booster inductor L1 when the first switching element Q1 is ON. When the second switching element Q2 is ON, energy stored in the booster inductor L1 is transferred to the first smoothing capacitor Ci.

In the current resonance converter unit 3, a soft switching is conducted through resonant operations by the full-bridge typed switching elements Q1 to Q4, and the resonant capacitor Cr and the resonant inductor Lr of the series resonant circuit 6 on the primary side of the high-frequency transformer T. Current that flows in the secondary winding of the high-frequency transformer T is rectified and smoothed by means of the rectifier diodes D3, D4 and a second smoothing capacitor Co thereby being able to obtain predetermined output voltages.

This circuit controls 4 switching elements Q1 to Q4 through a later-explained switching controller 12. In the switching elements Q1 to Q4, one pair of the first and fourth switching elements Q1, Q4 and another pair of the second and third switching elements Q2, Q3 alternatively perform an ON-and-OFF operation, respectively, so that high-frequency voltages that have been switched are applied to both ends of the primary winding of the high-frequency transformer T. The high-frequency voltages are then output to the secondary side through the high-frequency transformer T, and are converted into DC output voltages through rectifier and smoothing circuits.

Figure 2:
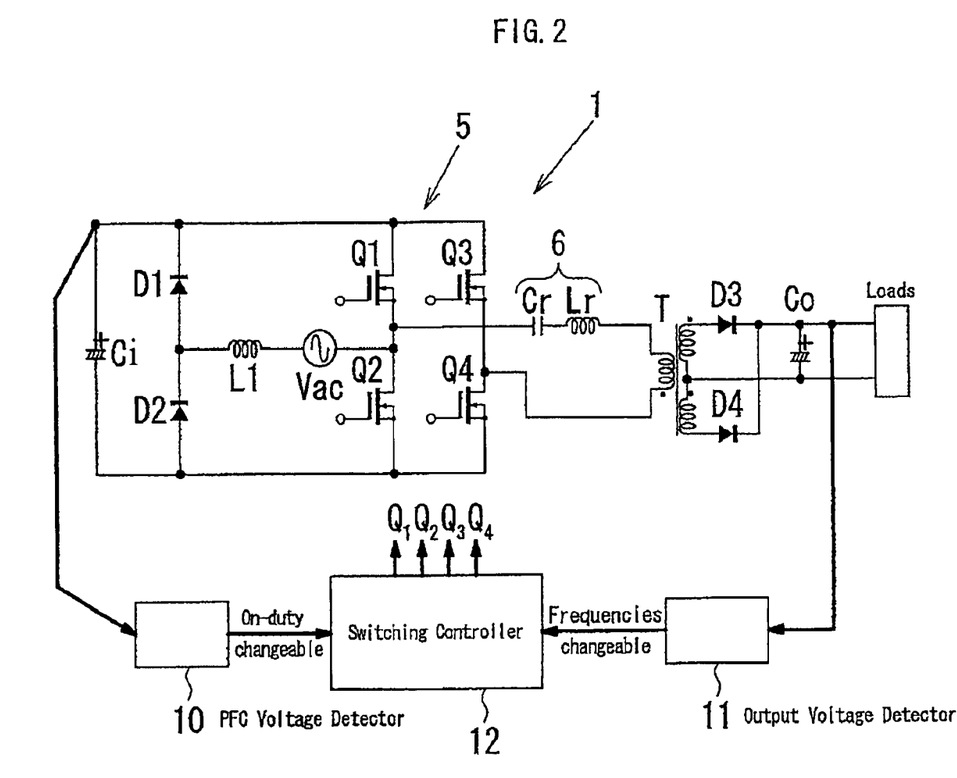
FIG. 2 is a circuit block diagram that shows performances of the switching control of the AC/DC converter circuit of FIG. 1.

Next, the circuit structure of the first embodiment of the present invention will be explained with reference to FIG. 2. FIG. 2 shows the AC/DC converter circuit 1 composed of the power-factor improvement unit 2 and the current resonance converter unit 3. FIG. 2 also shows a PFC voltage detector 10 that is connected in parallel with the first smoothing capacitor Ci of the AC/DC converter circuit 1; an output voltage detector 11 connected to the output side of the AC/DC converter circuit 1; and the switching controller 12 into which output signals from the PFC voltage detector 10 and the output voltage detector 11 are input. The full-bridge typed switching elements Q1 to Q4 are controlled by means of control signals from the switching controller 12.

In the power-factor improvement unit 2, the first and second switching elements Q1 and Q2 alternatively repeat ON-and-OFF operations. When an AC input is the positive half cycle, energy is stored in the booster inductor L1 when the second switching element Q2 is ON. When the first switching element Q1 is ON, energy stored in the booster inductor L1 is transferred to the first smoothing capacitor Ci. Here, for purpose of improving power-factors, the on-duty of the second switching element Q2 is changed according to the phase angle of the AC voltages, and controlled to be the minimum duty when the phase angle is 90 degrees. Further, when input voltages are the negative half cycle, the role of the first switching element Q1 and the second switching element Q2 will be reversed.

Next, the switching operation of the full-bridge circuit 5 according to the present invention will be explained. Considering inverter operations by the switching elements Q1 to Q4, when the first and fourth switching elements Q1, Q4 are ON, negative electrode voltages are applied to the resonant circuit composed of the high-frequency transformer T, the resonant capacitor Cr and the resonant inductor Lr. On the other hand, when the second and third switching elements Q2 and Q3 are ON, positive electrode voltages are applied to the resonant circuit. The above will repeat in an alternative manner.

Figure 3:
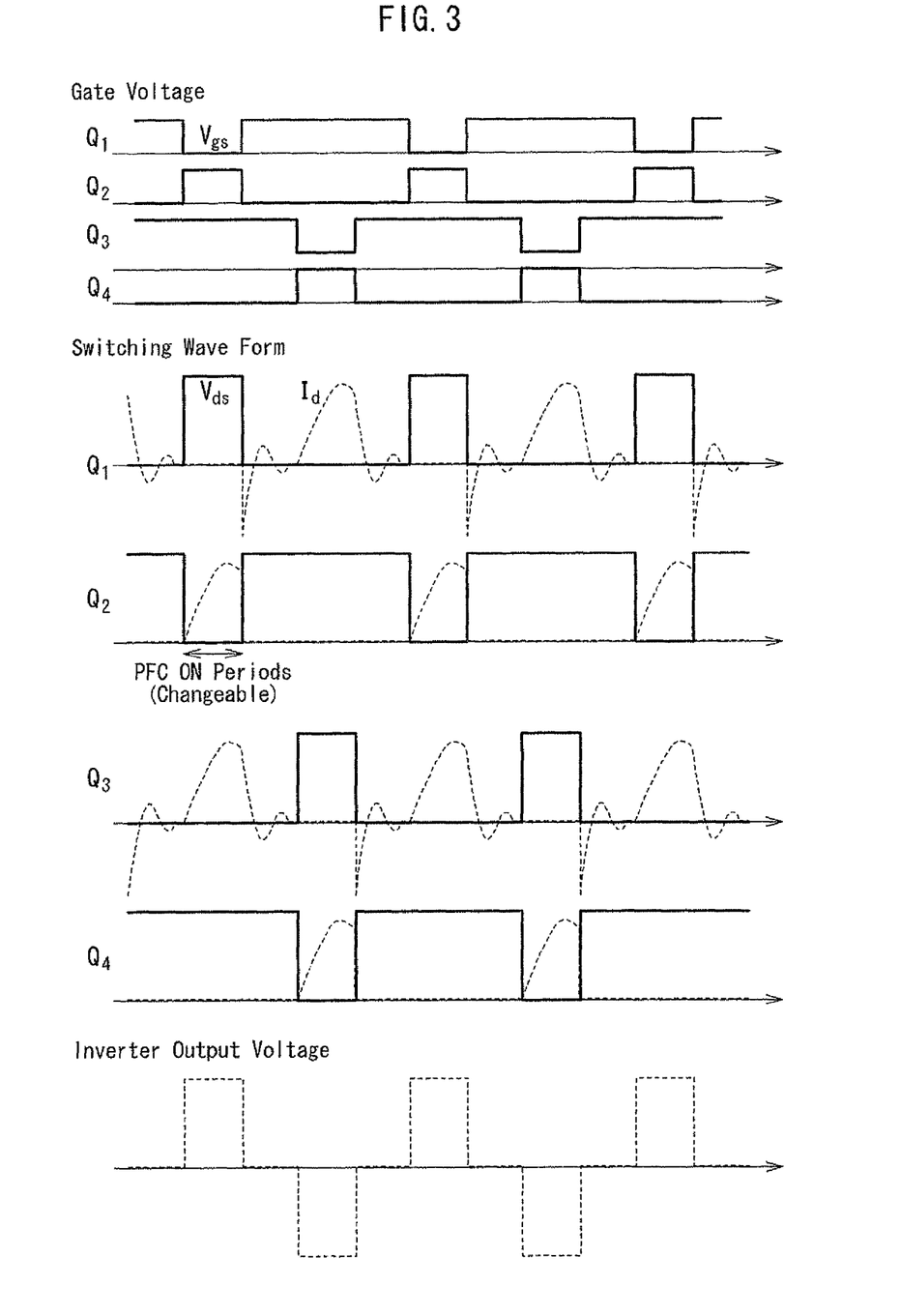
FIG. 3 is a waveform diagram that explains operations of a switching element according to the present invention.

FIG. 3 shows one example with reference to operations of the switching elements Q1 to Q4 when AC input voltages are the positive half cycle. The top portion of FIG. 3 shows a gate voltage Vgs of each switching elements Q1 to Q4. The first and second switching elements Q1, Q2, and the third and fourth switching elements Q3 and Q4 repeat ON-and OFF operations in a complementary manner, freely changing their on-duties.

The middle portion of FIG. 3 indicates the switching waveform of each switching elements Q1 to Q4 in which a voltage Vds between drain and source, and a drain current Id are shown. PFC ON periods are changeable. Here, the ON periods of the second switching element Q2 correspond to the PFC ON periods. Considering boost converter operations, energy is stored in the inductor L1 during the PFC ON period. When the second switching element Q2 is OFF (that is, when the first switching element Q1 is ON), energy stored in the booster inductor L1 is transferred to the first smoothing capacitor Ci.

The bottom portion of FIG. 3 shows full-bridge output voltages of the present invention. The third and fourth switching elements Q3, Q4 are adapted to perform as that the on-duty of the fourth switching element Q4 becomes equal to the on-duty of the second switching element Q2. Here, FIG. 3 shows that the output voltages of the full-bridge circuit 5 are allowed to perform ON-and-OFF operations with symmetrical pulse waveforms.

When AC input voltages are the negative half cycle, the switching waveforms of the first and second switching elements Q1, Q2 and the switching waveforms of the third and fourth switching elements Q3, Q4 become each reversed. Accordingly, it may be necessary to provide a polar detector to detect the polarity of the AC input voltages by inputting voltages of at least one end of the AC source Vac. Based on the detected polarity, switching of the switching elements Q1 to Q4 is controlled. Function and effect of the polar detector will be later explained in detail.

Based on the switching controls, the power-factor improvement operations and the PFC voltage controls are performed while changing the on-duty of the first and second switching elements Q1, Q2. Here, as regards the current resonance converter unit, the pulse width of the output voltages of the full-bridge circuit 5 is changed depending on the power-factor improvement operations. Accordingly, in general, the output voltages of the rectifier circuit on the secondary side is changed; however, by changing the switching frequencies of the switching elements Q1 to Q4 at the same time, gain of the resonant circuit composed of the high-frequency transformer T, the resonant capacitor Cr and the resonant inductor Lr can be controlled to obtain constant output voltage.

As discussed hereinabove, in the first embodiment of the present invention shown in FIG. 2, the on-duty of the first and second switching elements Q1, Q2 is changed based on output signals from the PFC voltage detector 10 so as to control PFC voltages. Further, based on output signals from the output voltage detector 11, the switching frequencies of the switching elements Q1 to Q4 which structures the full-bridge circuit 5 is changed so as to control output voltages.

In the present invention, since the full-bridge circuit is applied, it would be possible to change the on-duty of the switching elements Q1 to Q4 so as to eliminate deficiencies that reside in the half-bridge type circuit. When loads are small, by narrowing the on-duty of the first and second switching elements Q1, Q2, it makes possible to control the voltages of the first smoothing capacitor Ci, contributing to easy control. Further, by changing the switching frequencies of the switching elements Q1 to Q4, it makes the control of output voltages facilitated.

As easily understood, in the present invention, by adding the power-factor improvement unit to the current resonance converter unit of the full-bridge circuit structure, it becomes possible to eliminate the full-wave rectifier. Further, by partially sharing the switching elements of the power-factor improvement unit and the current resonance converter unit, it would be possible to reduce a number of parts, and to provide a high efficient switching power unit provided with power-factor improvement functions at relatively low cost.

Figure 4:
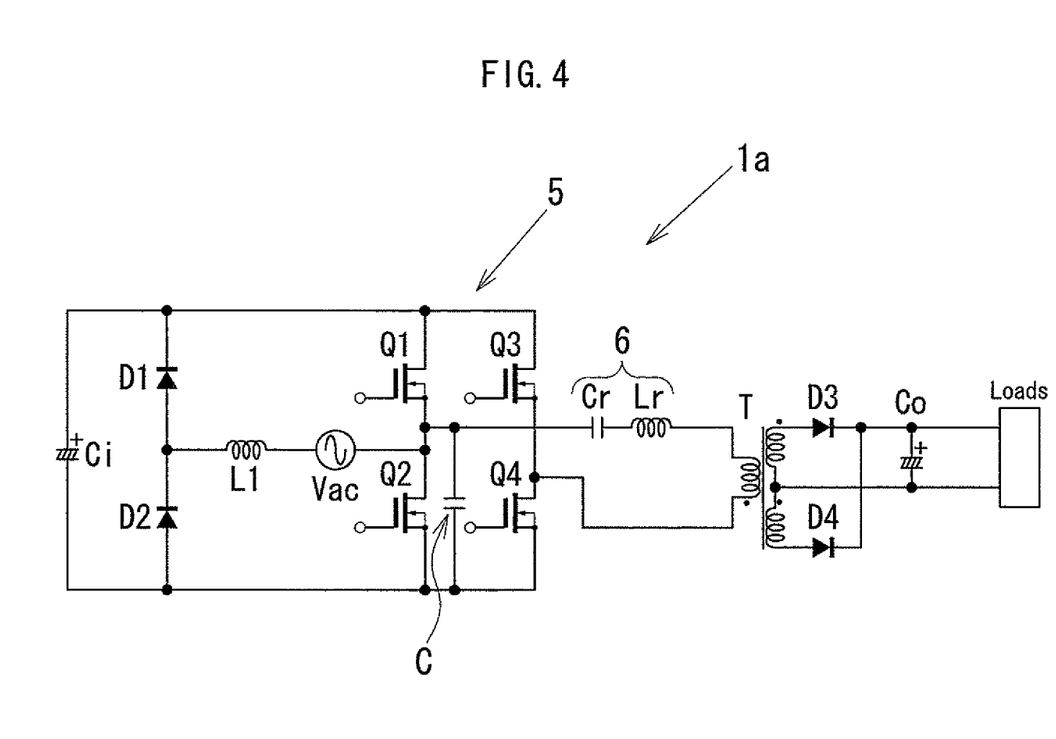
FIG. 4 is a circuit block diagram that shows the first modified example of the AC/DC converter circuit according to the switching power unit of the present invention.
Figure 5:
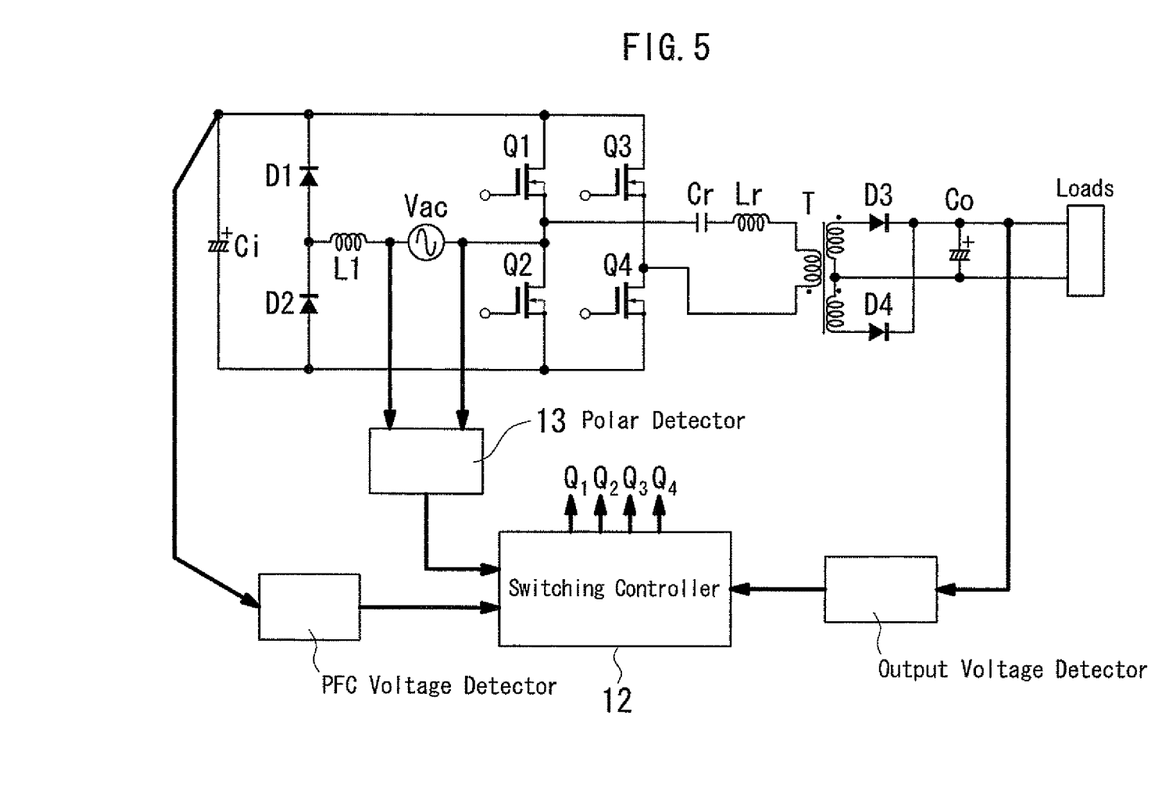
FIG. 5 is circuit block diagram that shows a second modified example corresponding to the first embodiment of the present invention as shown in FIG. 2.

Next, with reference to FIGS. 4 to 6, some modified examples of the present invention will be explained. In FIG. 4, a first modified example of the present invention is shown. This switching power unit comprises an AC/DC converter circuit 1a composed of the power-factor improvement unit 2 and the current resonance converter unit 3 as explained in FIG. 1. Further, a voltage resonance capacitor C is connected between the intermediate point of the first and second switching elements Q1, Q2 and the intermediate point of the second and fourth switching elements Q2, Q4, and is connected in parallel relative to the second switching element Q2.

By providing the voltage resonance capacitor C as explained above, the loss of the first and second switching elements Q1, Q2 in turn-off can be further reduced. In FIG. 5, a second modified example is shown. This switching power unit is provided with a polar detector 13 that is connected in parallel with an AC source Vac. This polar detector 13 receives voltage input from at least one end of the AC sources Vac so as to detect the polarity of alternating input voltages. The detected results are output to the switching controller 12 so as to each reverse function of the first and second switching elements Q1, Q2, and function of the third and fourth switching elements Q3, Q4.

Function and effect of the polar detector 13 will be explained. When the AC source Vac is the positive half cycle, energy is stored in the booster inductor L1 when the second switching element Q2 is ON. Accordingly, the smaller the output power to loads becomes, the narrower the on-duty of the second switching element Q2 needs to become (at the same time, the on-duty of the first switching element Q1 is widened). On the other hand, when the AC source Vac is the negative half cycle, when the first switching element Q1 is ON, energy is stored in the booster inductor L1. Accordingly, the smaller the output power to loads becomes, the narrower the on-duty of the first switching element Q1 needs to become (at the same time, the on-duty of the second switching element Q2 is widened). Accordingly, depending on whether the AC source Vac is the positive half cycle or the negative half cycle, it would be necessary to reverse the on-duty of the first switching element Q1 and the second switching element Q2.

Further, in order to make the output voltages of the full-bridge circuit symmetrical at positive polarities and negative polarities, it would be necessary that not only are the on-duty of the first and second switching elements Q1, Q2 reversed, but the on-duty of the third and fourth switching elements Q3, Q4 needs to be reversed.

As discussed hereinabove, by detecting the polarities of the AC source Vac by means of the polar detector 13, the on-duty of the first and second switching elements Q1 Q2 as well as the on-duty of the third and fourth switching elements Q3, Q4 are each reversed according to the detected result. It is thus possible to prevent the power-factor improvement unit 2 and the current resonance converter unit 3 from malfunction.

Figure 6:
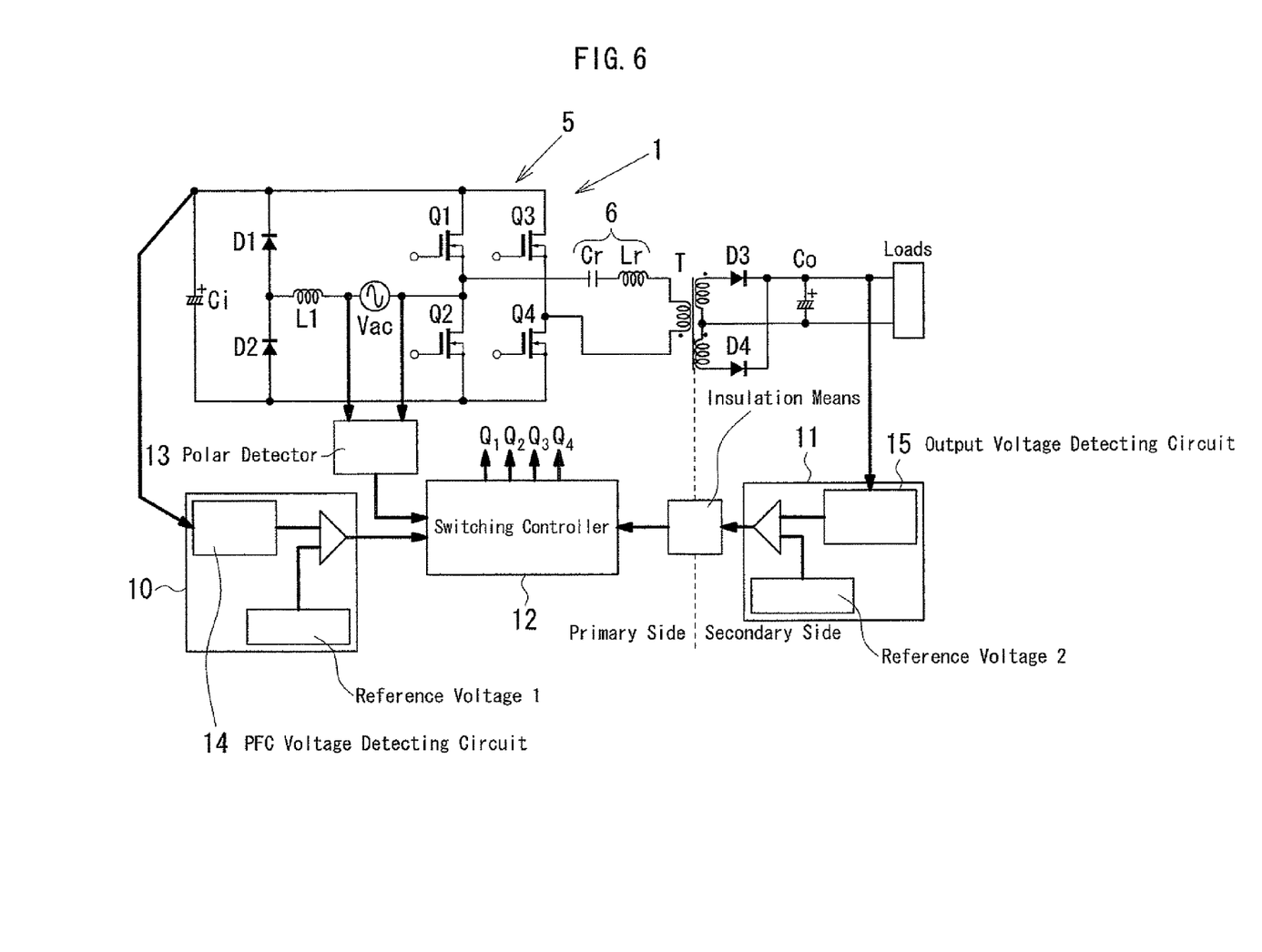
FIG. 6 is a circuit block diagram that shows a third modified example of the present invention.

FIG. 6 shows the third modified example of the present invention. This switching power unit shows further concrete structure of the PFC voltage detector 10 and the output voltage detector 11 shown in FIG. 2. Considering an AC/DC converter for a personal computer, a television, etc., an insulation means is generally provided between a primary circuit and a secondary circuit for safety purposes. Accordingly, in case that a switching controller 12 is arranged on the primary circuit side, it is structured as that output signals from the output voltage detector 11 on the secondary circuit side is transmitted to the switching controller 12 on the primary circuit through the insulation means (a first insulation means). This first insulation means is formed by a photocoupler or an isolating transformer. Further, the PFC voltage detector 10 and the output voltage detector 11 each include a detecting circuit that detects each voltage (a PFC voltage detecting circuit 14 and an output voltage detecting circuit 15), and an error amplifier that compares output voltage values from each voltage detecting circuit with reference voltage values (reference voltages 1 and 2).

Figure 7:
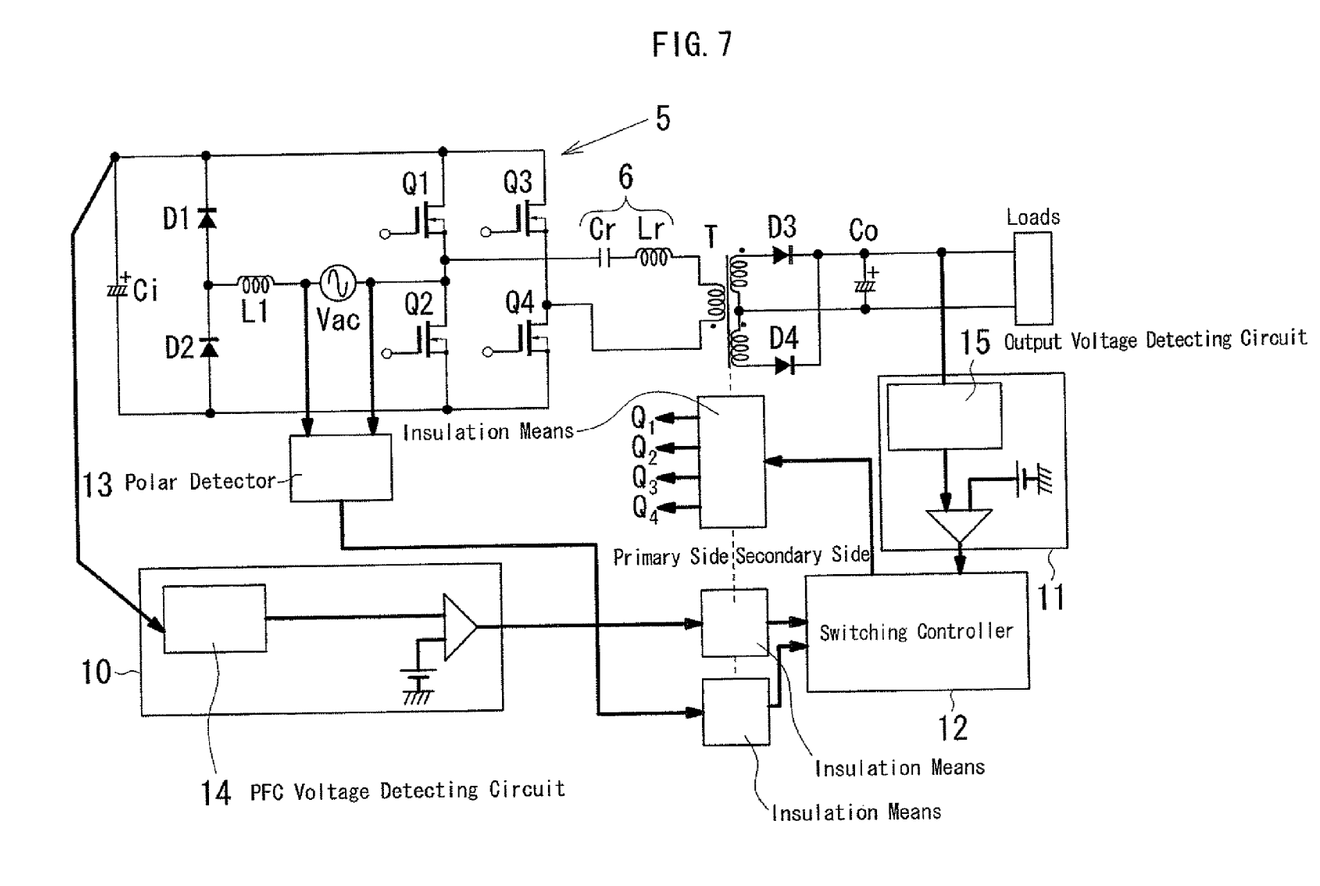
FIG. 7 is a circuit block diagram that shows a fourth modified example of the present invention.

FIG. 7 shows the fourth modified embodiment of the present invention where a switching controller 12 is arranged on the secondary circuit side. Here, output signals from a PFC voltage detector 10 on the primary side are transmitted to the switching controller 12 on the secondary side through an insulation means (a second insulation means). On the other hand, switching controlling signals output from the switching controller 12 based on output signals from an output voltage detector 11 on the secondary side and output signals from the second insulation means are transmitted to the switching elements Q1 to Q4 on the primary side through a third insulation means. Further, detected results obtained at a polar detector 13 on the primary side are transmitted to the switching controller 12 on the secondary side through a fourth insulation means.

In this circuit of the fourth modified example, as the same with the third modified example, each insulation means (the second to the fourth insulation means) is formed by a photocoupler or an isolating transformer. Further, the PFC voltage detector 10 and the output voltage detector 11 each include a detecting circuit that detects each voltage (the PFC voltage detecting circuit 14 and the output voltage detecting circuit 15), and an error amplifier that compares output voltage values from each voltage detecting circuit with a reference voltage value.

As discussed hereinabove, according to the third and the fourth embodiments of the present invention, since the plurality of insulation means (the first to the fourth insulation means) are provided, further safety switching power units can be provided.

What is claimed is:

1. A switching power unit comprising a full-bridge type AC/DC converter circuit structured in combination with a power-factor improvement unit and a current resonance converter unit, the power-factor improvement unit and the current resonance converter unit sharing first and second switching elements, the switching power unit including:
    a PFC voltage detector that is provided in the power-factor improvement unit and that detects PFC voltages stored in a first smoothing capacitor connected in parallel with a series circuit of the first and second switching elements;
    an output voltage detector that is provided in the current resonance converter unit and that detects DC output voltages stored in a second smoothing capacitor on a secondary side through a high-frequency transformer based on high-frequency voltages obtained by ON-and-OFF operations of a full-bridge circuit on a primary side, the full-bridge circuit being structured as that the first and second switching elements are connected in parallel with third and fourth switching elements; and
    a switching controller into which output signals from the PFC voltage detector and output signals from the output voltage detector are input so as to control ON-and-OFF operations of the first to fourth switching elements,
    wherein the switching controller controls the PFC voltage by changing on-duty of the first and second switching elements based on output signals from the PFC voltage detector, and also controls the output voltages by changing switching frequencies of the first to fourth switching elements based on output signals from the output voltage detector, the first and the second switching elements both being adapted to change the on-duty and the switching frequencies at the same time.

2. The switching power unit according to claim 1, wherein the power-factor improvement unit comprises: a series circuit of first and second diodes connected in parallel with the series circuit of the first and second switching elements in a forward direction; a booster inductor and an AC source connected in series at an intermediate portion between both of the series circuits; and the first smoothing capacitor connected at both ends of the series circuit of the first and second diodes so as to be placed in parallel to the first and second switching elements.

3. The switching power unit according to claim 1, wherein the current resonance converter unit comprises: a full-bridge circuit where the series circuit of the first and second switching elements and the series circuit of the third and fourth switching elements are connected in parallel; a series resonant circuit including a resonant inductor and a resonant capacitor on the primary side of the high-frequency transformer; and a rectifier circuit including a network of rectifier diodes and the second smoothing capacitor on the secondary side of the high-frequency transformer, wherein the series resonant circuit is connected in series with a primary winding of the high-frequency transformer, and also connected at the intermediate point of the first and second switching elements and the intermediate point of the third and fourth switching elements.

4. The switching power unit according to claim 1, wherein a voltage resonant capacitor is connected between the intermediate point of the first and second switching elements and the intermediate point of the second and fourth switching elements, the voltage resonant capacitor being connected in parallel with the second switching element.

5. The switching power unit according to claim 1, wherein the PFC voltage detector and the output voltage detector each include: a voltage detecting circuit; and an error amplifier that compares a reference voltage value with an output voltage value that is output from the voltage detecting circuit.

6. The switching power unit according to claim 2 further comprising a polar detector that is connected in parallel with the AC source where the first switching element is arranged on a high-voltage side while the second switching element is arrange on a low-voltage side,
    wherein the polar detector detects a voltage of at least one side of the AC source so as to detect polarity of the AC source and to output the detected result to the switching controller;
    the switching controller sets on-duty of the second switching element to 50% or less in case that the intermediate point side of the first and the second switching elements of the AC source is a positive polarity; and the switching controller sets on-duty of the first switching element to 50% or less in case that the intermediate point side of the first and second diodes of the AC source is a positive polarity.

7. The switching power unit according to claim 1, wherein the switching controller is arranged on the primary side of the high-frequency transformer, and output signals from the output voltage detector on the secondary side is transmitted to the switching controller on the primary side through a first insulation means.

8. The switching power unit according to claim 1, wherein the switching controller is arranged on the secondary side of the high-frequency transformer; output signals from the PFC voltage detector on the primary side is transmitted to the switching controller on the secondary side through a second insulation means; and switching controlled signals output from the switching controller are transmitted to the first to fourth switching elements on the primary side through a third insulation means based on output signals from the output voltage detector on the secondary side, and based on output signals from the second insulation means.

9. The switching power unit according to claim 8, wherein output signals from the polar detector are transmitted to the switching controller on the secondary side through a fourth insulation means.

10. The switching power unit according to claim 7, wherein the first to fourth insulation means are a photocoupler or an isolating transformer.

11. The switching power unit according to claim 3, wherein the resonant inductor is replaceable by a leakage inductance of the high-frequency transformer.

12. A switching power unit comprising a full-bridge type AC/DC converter circuit structured in combination with a power-factor improvement unit and a current resonance converter unit, the power-factor improvement unit and the current resonance converter unit sharing first and second switching elements, the switching power unit including:
a PFC voltage detector that is provided in the power-factor improvement unit and that detects PFC voltages stored in a first smoothing capacitor connected in parallel with a series circuit of the first and second switching elements;
an output voltage detector that is provided in the current resonance converter unit and that detects DC output voltages stored in a second smoothing capacitor on a secondary side through a high-frequency transformer based on high-frequency voltages obtained by ON-and-OFF operations of a full-bridge circuit on a primary side, the full-bridge circuit being structured as that the first and second switching elements are connected in parallel with third and fourth switching elements; and
a switching controller into which output signals from the PFC voltage detector and output signals from the output voltage detector are input so as to control ON-and-OFF operations of the first to fourth switching elements,
wherein the switching controller controls the PFC voltage by changing on-duty of the first and second switching elements, and also controls the output voltages by changing switching frequencies of the full-bridge circuit based on output signals from the PFC voltage detector and the output voltage detector, respectively, and
the power-factor improvement unit comprises: a series circuit of first and second diodes connected in parallel with the series circuit of the first and second switching elements in a forward direction; a booster inductor and an AC source connected in series at an intermediate portion between both of the series circuits; and the first smoothing capacitor connected at both ends of the series circuit of the first and second diodes so as to be placed in parallel to the first and second switching elements,
the switching power unit further comprising a polar detector that is connected in parallel with the AC source where the first switching element is arranged on a high-voltage side while the second switching element is arrange on a low-voltage side,
wherein the polar detector detects a voltage of at least one side of the AC source so as to detect polarity of the AC source and to output the detected result to the switching controller,
the switching controller sets on-duty of the second switching element to 50% or less in case that the intermediate point side of the first and the second switching elements of the AC source is a positive polarity, and
the switching controller sets on-duty of the first switching element to 50% or less in case that the intermediate point side of the first and second diodes of the AC source is a positive polarity.

13. A switching power unit comprising a full-bridge type AC/DC converter circuit structured in combination with a power-factor improvement unit and a current resonance converter unit, the power-factor improvement unit and the current resonance converter unit sharing first and second switching elements, the switching power unit including:
a PFC voltage detector that is provided in the power-factor improvement unit and that detects PFC voltages stored in a first smoothing capacitor connected in parallel with a series circuit of the first and second switching elements;
an output voltage detector that is provided in the current resonance converter unit and that detects DC output voltages stored in a second smoothing capacitor on a secondary side through a high-frequency transformer based on high-frequency voltages obtained by ON-and-OFF operations of a full-bridge circuit on a primary side, the full-bridge circuit being structured as that the first and second switching elements are connected in parallel with third and fourth switching elements; and
a switching controller into which output signals from the PFC voltage detector and output signals from the output voltage detector are input so as to control ON-and-OFF operations of the first to fourth switching elements,
wherein the switching controller controls the PFC voltage by changing on-duty of the first and second switching elements, and also controls the output voltages by changing switching frequencies of the full-bridge circuit based on output signals from the PFC voltage detector and the output voltage detector, respectively,
the switching controller is arranged on the secondary side of the high-frequency transformer; output signals from the PFC voltage detector on the primary side is transmitted to the switching controller on the secondary side through a second insulation means; and switching controlled signals output from the switching controller are transmitted to the first to fourth switching elements on the primary side through a third insulation means based on output signals from the output voltage detector on the secondary side, and based on output signals from the second insulation means, and
output signals from the polar detector are transmitted to the switching controller on the secondary side through a fourth insulation means.

* * * * *